United States Patent [19]

Griepentrog

[11] Patent Number: 5,894,327

[45] Date of Patent: Apr. 13, 1999

[54] VIDEO DISPLAY SYSTEM WITH AKB RESPONSIVE SCREEN GRID SUPPLY

[75] Inventor: Dal Frank Griepentrog, Indianapolis, Ind.

[73] Assignee: Thomson Consumer Electronics, Inc., Indianapolis, Ind.

[21] Appl. No.: 08/907,312

[22] Filed: Aug. 6, 1997

Related U.S. Application Data

[63] Continuation of application No. 08/261,679, Jun. 17, 1994, abandoned.

[51] Int. Cl.$^6$ .............................. H04N 5/68; H04N 9/72
[52] U.S. Cl. .................. 348/379; 348/380; 348/697; 348/689; 315/381; 315/388
[58] Field of Search .................... 348/691, 695, 348/697, 678, 677, 689, 806, 377, 379, 380; 315/388, 387, 381, 403, 409, 371, 411; H04N 5/16, 3/26, 5/68, 9/72

[56] References Cited

U.S. PATENT DOCUMENTS

| | | | |
|---|---|---|---|
| 3,812,397 | 5/1974 | Marsh, Jr. | 315/31 |
| 3,820,155 | 6/1974 | Neal | 178/5.4 |
| 3,959,811 | 5/1976 | Shanley, II | 358/10 |
| 4,316,212 | 2/1982 | Rodda | 358/10 |
| 4,450,476 | 5/1984 | Tallant, II | 358/74 |
| 4,584,596 | 4/1986 | Tallant, II | 358/10 |
| 4,660,083 | 4/1987 | Allen | 348/689 |
| 4,689,679 | 8/1987 | Hinn | 348/691 |
| 4,930,004 | 5/1990 | Yamamoto et al. | 348/691 |
| 5,278,476 | 1/1994 | Ten Pierick et al. | 315/387 |

FOREIGN PATENT DOCUMENTS

| | | | |
|---|---|---|---|
| 0396077 | 4/1991 | Japan | H04N 5/16 |
| WO-A-9310640 | 5/1993 | WIPO | H04N 9/72 |

OTHER PUBLICATIONS

PCT Search Report and a Turkey Search Report concerning corresponding foreign filed applications.

*Primary Examiner*—Sherrie Hsia
*Attorney, Agent, or Firm*—Joseph S. Tripoli; Peter M. Emanuel; Robert D. Shedd

[57] ABSTRACT

Video signals to be displayed are applied via a video driver amplifier to the cathode electrode of a kinescope. A beam current sensor, also coupled to the cathode electrode, provides a beam current indicating signal. An AKB regulator, responsive to the beam current indicating signal, supplies a black level correction signal to the driver amplifier for regulating the black level of images displayed by the kinescope. A screen grid supply system is provided for controlling the G-2 (screen grid) voltage of the kinescope as a predetermined function of the black level correction signal thereby forming with the AKB regulator a dual feedback loop for providing black level regulation by both the driver amplifier and the screen grid thereby maximizing or extending the overall black level control range. Consequently, the high voltage screen control potentiometer normally required for setting screen grid bias may be completely eliminated if desired, or, in applications where it is retained, no adjustments are required subsequent to an initial adjustment.

16 Claims, 7 Drawing Sheets

VIDEO DISPLAY SYSTEM WITH AKB RESPONSIVE SCREEN GRID SUPPLY

This is a continuation of application Ser. No. 08/261,679, filed Jun. 17, 1994 now abandoned.

FIELD OF THE INVENTION

This invention relates to television systems generally and particularly to screen grid (G2) bias sources in television systems of a type employing one or more kinescopes as display devices.

BACKGROUND OF THE INVENTION

Most television display systems currently in use employ kinescopes as display devices. The screen or G2 grid, interposed between the control grid and the focusing electrodes, influences a number of significant kinescope operating parameters. Incorrect adjustment may adversely affect the nominal black level of the picture, the color temperature, the kinescope driver amplifier dissipation and the spot size or sharpness capability.

In more detail, in a color kinescope the black level voltage of each electron gun is related to the magnitude of the bias voltage applied to the kinescope G2 (screen) grid. A color kinescope with an "in-line" electron gun structure has a G2 grid electrode energized in common to all three electron guns while a kinescope with separate "delta-type" electron guns has separately energized G2 grid electrodes for each gun. In either case, the G2 bias voltage is often set at a value between 400 and 800 volts, illustratively, so that a desired cathode-to-G1 (control) grid voltage produces a black level condition.

High brightness and high resolution in a reproduced image require a high kinescope peak beam current capability and a small spot size. For each gun, peak beam current capability increases with increasing black level voltage, which is related to the G2 bias voltage. The need for high brightness and high resolution suggests that the highest available G2 bias voltage should be used, consistent with other requirements and constraints on the receiver design.

Some television receivers also employ automatic kinescope bias (AKB) control systems for maintaining a desired black level kinescope cathode bias. Such systems operate to maintain desired cathode-to-G1 bias for each electron gun, and should be capable of operating over a range of black level bias voltages at least as great as the maximum difference in black level voltage between any two kinescope electron guns, which, illustratively, may be on the order of 50 volts or so. To compensate for other system parameter tolerances as well, the operating range of a typical AKB system may be as great as 100 volts. The choice of an operating point within that range is determined by the G2 grid bias voltage. Consequently, it is conventional practice to manually adjust the G2 bias voltage on each receiver to insure that the black level bias voltage of each kinescope electron gun is within the operating range of the AKB system. Furthermore, to obtain high brightness and resolution in a displayed image, the G2 bias voltage should be adjusted so as to make the black level bias voltage of the electron gun with the highest (i.e., most positive) black level voltage nearly equal to the highest usable black level bias voltage capable of being produced by the kinescope driver stages.

When adjusting the G2 screen grid bias, it is also desirable to assure that adequate dynamic range in the blacker than black direction exists for image blanking reserve purposes, particularly in the presence of variations of the operating supply voltage for the kinescope driver circuits.

A known approach to G2 bias adjustment is described by Tallant in U.S. Pat. No. 4,584,596 entitled TELEVISION RECEIVER ALIGNMENT SYSTEM which issued Apr. 22, 1986. The adjustment is manually performed in the receiver service mode and requires modification of the normal bias voltages of both the cathode and the control grid G1 to produce a predetermined cathode-to-G1 voltage. In an illustrative embodiment, the receiver is placed in a service mode which disables the output transistor of the kinescope driver, concurrently disables the automatic kinescope bias (AKB) circuitry and applies an elevated bias voltage (e.g. about double the normal value) to the kinescope control grid G1 whereupon the G2 adjustment is made manually by setting a screen voltage potentiometer.

SUMMARY OF THE INVENTION

It is herein recognized that a need exists for a simplified screen voltage adjustment system which provides optimum performance of the kinescope parameters noted above but which does not require elevating the G1 voltage, which does not require disabling of the AKB circuitry and which does not require disabling of the output transistor of the kinescope driver amplifier. The present invention is directed, in a first respect, to meeting those needs.

It is further recognized herein that the problem of screen grid adjustment has become increasingly more critical with the increased use of so called "dual focus" electron guns which provide reduced spot size. It has been found that in such guns leakage between the focus and screen grids tends to increase with time. Since the focus electrode operates at thousands of volts, the inter-electrode leakage tends to change (increase) the screen voltage. The leakage may be cleared or reduced when the kinescope arcs or breaks down between electrodes. As a result, the black level bias may change excessively and may exceed the correction range of the AKB circuitry.

In more detail, the cathode to grid bias for the highest cut-off bias gun may be, illustratively, on the order of 190 volts or so with the other two guns being biased at a lower cut-off voltage because of inherent differences in their characteristics such as leakage. An increase in the leakage current into the screen electrode G2 will cause the AKB bias to increase the cut-off bias of all three of the guns. The amount of leakage experienced can cause the highest cut-off gun bias to "rail" (i.e., reach the maximum positive supply voltage available) due to limitations of the correction range of the AKB system which, in turn, can result in a significant change in low light color temperature. Although the screen bias can be re-adjusted after the leakage increase, this leakage may clear with a kinescope arc resulting in another error in brightness and color temperature and necessitating yet another adjustment.

It is herein recognized that a need exists for a more "robust" AKB system, that is, one which is more tolerant of inter-electrode leakage effects and requires less frequent screen adjustments or, in a specific application described herein, requires no adjustments at all.

Embodiments of the invention herein described include both fully automatic systems requiring no adjustments at all and semi-automatic systems requiring no adjustments at all after an initial adjustment.

Advantageously, the fully automatic systems avoids both the initial adjustment costs and the servicing adjustment costs associated with the screen control potentiometer.

Some advantages of the semi-automatic embodiments of the invention are that they do not require the use of relatively high voltage transistors yet are fully capable of producing a screen voltage correction range on the order of plus or minus 100 volts which has been found to be adequate to maintain black level and color temperature.

In principle, the advantages of the invention are achieved by means of pair of feedback loops which are "linked", so to speak, in that they share certain common elements. In the first linked loop, feedback control is provided from a beam current sensor to a kinescope driver amplifier via an AKB regulator. In the second loop, feedback control is provided from the beam current sensor and AKB regulator to the screen grid via a screen grid bias control unit. Both loops are linked in that they share the beam current sensor and portions of the AKB regulator as will be described.

Advantageously, since the dual or "nested" feedback loops of the present invention provide black level regulation by both the driver amplifier and the screen grid, there is a desirable maximization or extension of the overall black level control range whereby the screen control may be completely eliminated if desired, or, in applications where it is retained, no adjustments are required subsequent to an initial adjustment.

A method, embodying the invention, for adjusting the black level of a kinescope, comprises applying a screen grid potential to a screen grid of the kinescope, applying a video signal to a cathode of the kinescope and sensing the kinescope beam current to provide a beam current indicating signal. A black level adjustment current is derived from the black level indicating signal and is applied to the kinescope cathode and concurrently the screen grid potential is adjusted as a function of the black level indicating signal.

Video display apparatus, embodying the invention, comprises a kinescope having a cathode and a screen grid and a source of screen grid voltage coupled to the screen grid. A video driver amplifier is provided having an input coupled to receive a video input signal and an output coupled to supply an amplified video signal to the cathode. A beam current sensor, coupled to the cathode, provides a beam current indicating signal. An AKB controller, responsive to the beam current indicating signal, produces and supplies a black level correction signal to the driver amplifier for regulating the black level of images displayed by the kinescope. A screen grid bias control circuit, coupled to the source and to the AKB controller, varies the kinescope screen grid voltage as a function of the black level correction signal of the AKB controller.

As discussed in detail hereafter and demonstrated by a number of specific examples, the principles of the invention are of general utility and are applicable to both color and monochrome kinescope display systems which may be of either the direct-view type or of the projection type.

BRIEF DESCRIPTION OF THE DRAWING

The foregoing and further features of the invention are illustrated in the accompanying drawing wherein like elements are denoted by like reference designators and in which.

DETAILED DESCRIPTION

Figure 1:
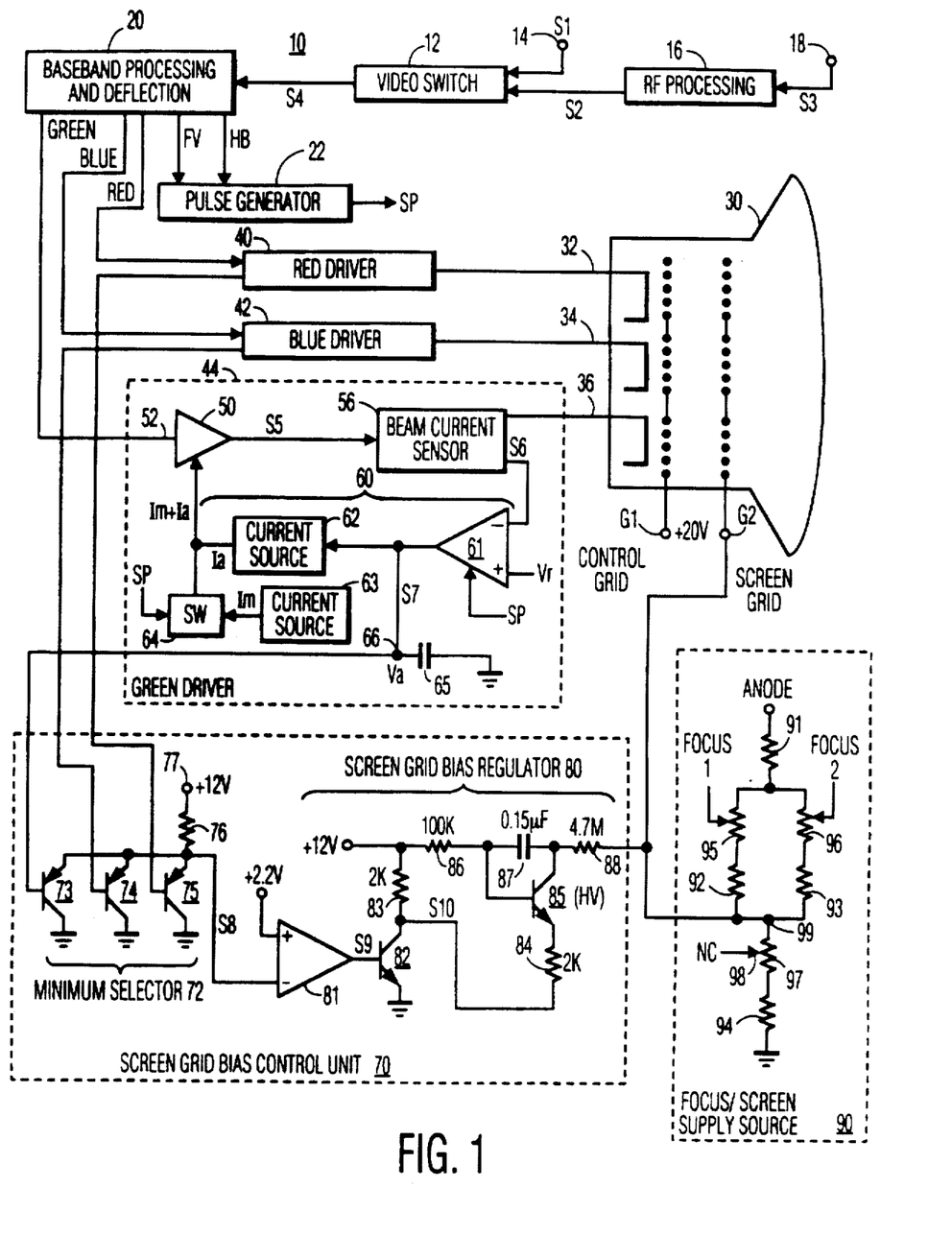
FIG. 1 is a block diagram, partially in schematic form, of a first embodiment of the invention in a television display system employing a direct-view color kinescope and providing fully automatic screen grid bias control.

The television receiver 10 of FIG. 1 features complete elimination of the need for manual adjustment of the screen grid G2 high voltage supply while providing a relatively wide and robust AKB operating range. In this specific example of the principles of the invention, the kinescope employed is a direct-view type having three guns for display of color images and includes one screen electrode (G2) common to the three guns. Other examples will be given illustrating application to kinescopes having a separate screen grids for each gun.

Receiver 10 includes a switch 12 for selecting a baseband video signal S1 provided by an auxiliary input terminal 14 or a baseband video signal S2 provided by an RF processing unit 16 having antenna input terminal 18 for connection to a suitable RF video source such as an antenna, cable or VCR. Unit 16 may be of conventional design including, for example, a tuner, IF amplifier and video detector for converting the RF input signal (S3) applied to terminal 18 to baseband form. The selected video signal S4 (i.e., signals S1 or S2) selected by switch 12 is applied to a baseband video processing and deflection unit 20 which produces component red (R), blue (B) and green (G) video signals for display by a direct-view color kinescope 30. The deflection portion of unit 20 also provides a vertical timing signal FV and a horizontal timing signal HB to a pulse generator 22 which generates AKB sample pulses SP during lines of the vertical interval for facilitating AKB control as will be described. Unit 20 may be of conventional design and may include, illustratively, color demodulation circuitry, control circuitry for hue, tint, brightness and contrast as well as a matrix for generating the RGB component signals and synchronizing and deflection circuitry which provides the timing signals FH and HB.

The RGB color signals are applied to respective cathodes 32, 34 and 36 of the kinescope 30 by means of respective kinescope driver circuits 40, 42 and 44. The driver circuits are identical and so, to simplify the drawing, only the details of the green driver 44 (outlined in phantom) are shown.

Figure 4:
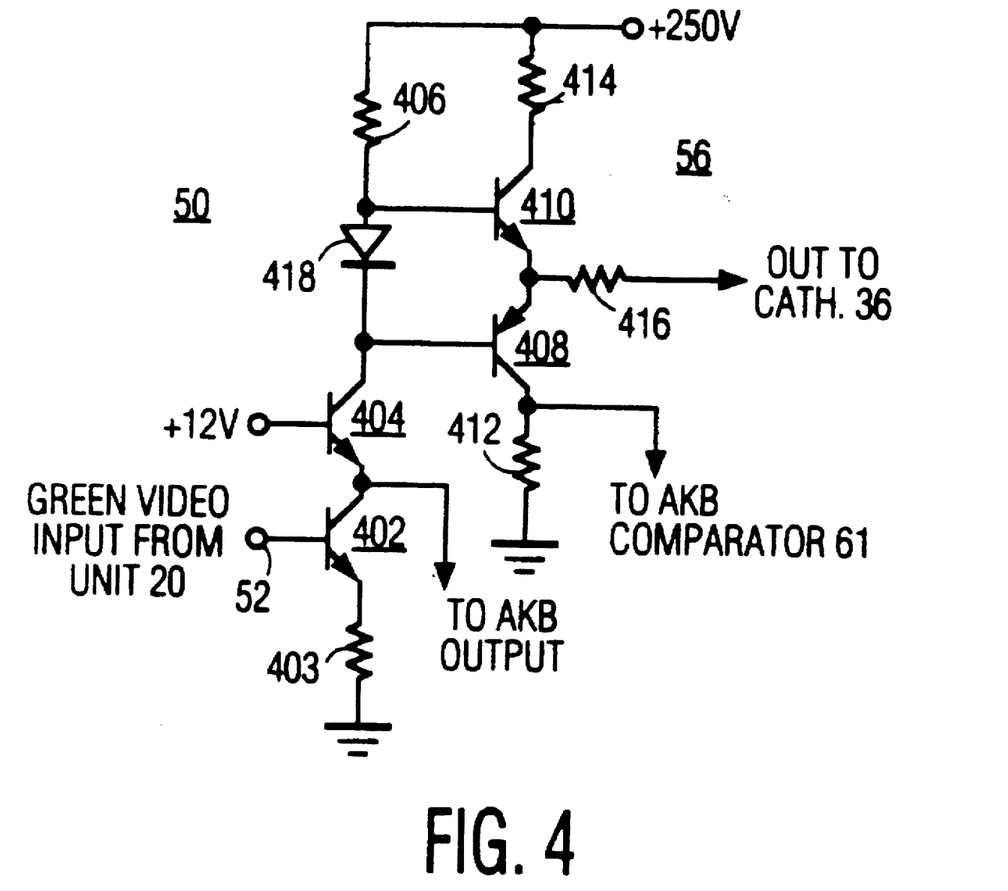
FIG. 4 is a schematic diagram of a driver amplifier and beam current sensor suitable for use in the embodiments of FIGS. 1, 2 and 3.

Driver circuit 44 comprises an amplifier 50 having an input 52 coupled to receive the green video signal provided by unit 20 and has an output 54 coupled to supply an amplified video signal S5 to the cathode 36 of kinescope 30. A beam current sensor 56 is also coupled to the cathode 36 for providing a beam current indicating signal S6. In this particular example of the invention the beam current sensor 56 provides the dual functions of both sensing the kinescope beam current and acting as a unity gain voltage follower for coupling the amplified video signal S5 to the cathode electrode 36. FIG. 4, discussed later, provides details of exemplary amplifiers and current sensors.

The remainder of driver circuit 44 comprises an automatic kinescope bias (AKB) regulator circuit 60 which is responsive to the beam current indicating signal S6 for producing and supplying a black level correction or "adjustment" signal (Ia) to the driver amplifier 50 for regulating the black level of images displayed by kinescope 30.

AKB regulator 60 comprises a keyed comparator 61, two current sources 62 and 63, a switch 64 and a capacitor 65. Considered alone, the regulator operates as a single feedback loop which regulates the kinescope black level based on the output of the current sensor output signal S6. In the present invention, however, the regulator 60 forms dual feedback control loops or a "linked" loop system as previously mentioned for black level regulation, the first loop being from the current sensor 56 to the driver amplifier 50 and the second loop is from the current sensor 56 to the screen grid via the screen grid bias control unit 70 as will be described.

Considering now the details of the first one of the dual feedback black level control loops, in AKB regulator 60 the beam current indicating signal S6 is applied to a keyed comparator 61 which is enabled by the AKB sample pulse SP produced by pulse generator 22 and compares signal S6 with a reference signal Vr and provides an output signal S7 which indicates if the beam current is above or below the black level beam current reference level represented by the reference signal Vr. The signal S7 is smoothed by means of a capacitor 65 and controls the magnitude of a black level "adjustment" or correction current Ia which is applied to the driver amplifier 50 which, by feedback regulates the black level beam current at the level determined by the reference signal Vr. This regulation is facilitated by the second current source 63 which produces a reference level measurement current Im that is applied to amplifier 50 via switch 64 which is closed for a few lines of the vertical interval in response to the AKB sample pulse SP.

Summarizing, briefly, the operation of the first of the twin control loops (the AKB loop), when the AKB sample pulse occurs during the vertical interval of the video signal S4, the red, green and blue video signals are blanked and switch 64 is closed for applying the measurement current produced by current source 63 to the driver amplifier 50. This biases the cathode of kinescope 30 to conduct a reference level beam current which should correspond to the reference signal Vr. The actual beam current produced by kinescope 30 depends on factors such as temperature, age, effective cathode impedance and, importantly, the screen grid voltage. The "actual" current is determined by the keyed comparator 61 which determines if the actual beam current, as sensed by beam current sensor 56, is above or below the value of the reference signal. The beam current error is smoothed by means of capacitor 65 and applied to the adjustment or correction current source 62 which applies the adjustment current Ia to amplifier in a sense to regulate the beam current to the value determined by the black level beam current reference signal Vr applied to the keyed comparator 61.

The second loop of the dual loop control system, in accordance with the invention, comprises a screen grid bias control unit 70 (outlined in phantom) and a focus screen supply source 90 (outlined in phantom) which utilizes the beam current indicating signal S6 provided by beam current sensor 56 to control the screen G2 voltage of the kinescope 30 as a function of the beam current. The "function" referred to is the integral of the beam current error (i.e., the "smoothed" beam current error) and this is provided by capacitor 65 in the AKB circuit 60.

Summarizing, briefly, in the present invention, the AKB circuit performs the dual functions of generating the adjustment current Ia for black level control via the driver amplifier 50 feedback control loop and generates the smoothed beam current error signal Va across capacitor 65 for black level control via the second feedback loop to the screen grid of kinescope 30.

Considering now the details of the second "nested" or "shared" feedback loop, the screen grid bias control unit 70 comprises a minimum value selector circuit 72 and a screen grid bias regulator circuit 80. Selector 72 comprises three common collector PNP transistors 73, 74 and 75 having a common emitter resistor 76 coupled to a source of supply voltage 77 via a load resistor 76 and having respective base electrodes coupled to receive the smoothed error signal Va from respective ones of the smoothing capacitors 65 in the red, blue and green drivers 40, 42 and 44. Accordingly, the output signal S8 developed by emitter load resistor 76 represents the lowest black level of the three kinescopes measured during the AKB sample pulse period in the vertical interval of video signal S4.

At this point it is instructive to note that the minimum selector circuit 72 is needed only in the case of display systems employing kinescopes with three guns and a common screen grid. For kinescopes with three guns and separate grids, or production systems employing three kinescopes or monochrome systems employing a one gun kinescope, the minimum selector is not needed and may be omitted. It is essential, however, for the common screen case as a measure of the least value of the correction current is needed for the three guns since only one screen correction, in such a case, can be made.

The output signal S8 of the minimum selector 72 is applied to a comparator amplifier 81 of the screen grid bias regulator 80 which provides a difference signal S9 representing the difference between signal S8 and a reference level (e.g., 2.2 volts) which represents a regulation level for control of the screen grid G2 voltage. The difference (or screen grid bias error signal) S8 is applied to a common emitter connected transistor 82 which develops an amplified screen grid error signal S10 across its collector load resistor 83. Signal S9 is applied via an emitter resistor 84 to a high voltage amplifier transistor 85 connected in a shunt high voltage regulator configuration. For this purpose, the base of transistor 85 is coupled to a fixed reference voltage via a resistor 86 for receiving operating bias and is coupled also the collector via a capacitor 87 which provides integration or smoothing of the regulator output by means of the Miller effect. The output of the regulator (collector of transistor 85) is coupled via a relatively high valued resistor 88 (e.g., 4.7 meg-Ohms) to the screen grid G2 of kinescope 30 and to the output 99 of a focus/screen supply source 90 which serves as a preferred source of high voltage for operation of the screen grid G2.

Digressing, briefly, the reason that a focus/screen supply circuit is preferred as a source of high voltage for the regulator 80 is that such units are normally incorporated in television systems for providing kilovolt range voltages for operation of the focus electrodes of the kinescope and sub-kilo voltages for biasing the screen grid. Conventionally, such units are provided as a printed circuit assembly with resistors 91–94 and potentiometers 95–97 connected as a voltage divider configuration, as shown, which divides the very high ultor voltage (e.g., 30 kV or so) to produce the two adjustable focus voltages (focus 1 and focus 2 via potentiometers 95 and 96)) and an adjustable screen grid voltage via potentiometer 97. In this particular embodiment of the present invention, the screen grid supply potentiometer 97 is not used. Rather, the high voltage for the screen grid is taken across resistors 94 and 97.

Advantageously, one may remove the screen grid potentiometer from the focus screen assembly in this example of the invention and replace it with a fixed resistor of the same value. Alternatively, one does not even need the focus/screen supply assembly for providing the screen voltage. Any suitable source of moderately high voltage (e.g., 800 volts or so) will do. All that is needed is a voltage source and a suitable voltage dropping resistor with an appropriate adjustment of the value of resistor 88 in regulator 80.

A more significant advantage of this embodiment of the invention lies in the complete elimination of adjustment of the screen grid high voltage potentiometer. No adjustment is required in initial factory set-up or in later servicing of the display system. This embodiment of the invention, in other words, provides completely automatic control of the screen grid voltage while optimizing the AKB control range, the black level, the low light color balance and other parameters previously noted.

To summarize the overall construction and operation of both control loops described in detail above, the video driver amplifier 50 amplifies the green video signal provided by unit 20 and applies the amplified signal S5 to the cathode 36 of kinescope 30 which receives screen grid G2 bias from the output 99 of the focus/screen assembly 90. The beam current sensor 56 samples the kinescope beam current and supplies a beam current indicating signal S6 to the AKB regulator 60 which produces and supplies a black level correction signal back to amplifier 50 for regulating the black level of kinescope 30. The screen grid bias control unit 70, coupled to capacitor 65 in AKB unit 60, varies the screen grid voltage as a function of the black level correction signal Ia of the AKB regulator 60. In this embodiment of the invention, the function comprises the smoothed value Va of the correction signal produced across capacitor 65 with the minimum being selected by minimum selector circuit 72 for effecting the screen grid control.

Figure 2:
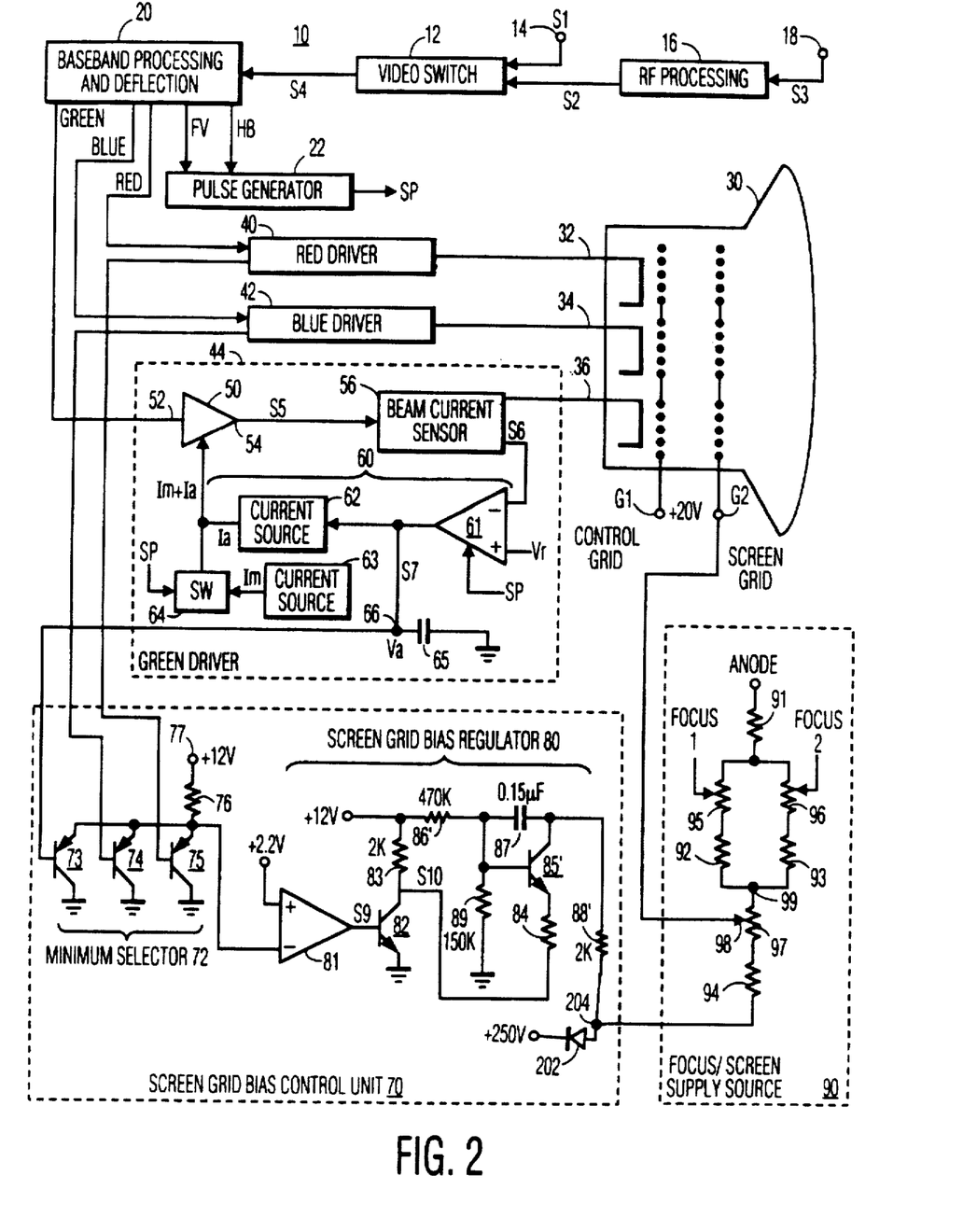
FIG. 2 is a block diagram, partially in schematic form, illustrating a modification of the embodiment of FIG. 1 for providing semi-automatic screen grid bias control.

FIG. 2 illustrates a modification of the system of FIG. 1 which enables the use of a lower voltage control transistor in regulator 80 and which does not require any modification of the focus screen supply source 90 (i.e., installing an output tap between potentiometer 97 and resistor 94 is not required).

In more detail, in FIG. 2 regulator 80 has been modified by replacing resistor 86 with a higher valued resistor 86', adding a further resistor 89 between the base of the output transistor and ground to form a base voltage divider, replacing the previous relatively high voltage output transistor 85 with a lower voltage transistor 85', replacing the output resistor 88 with one of lower resistance 88' and coupling the output 204 to a source of moderate supply voltage (e.g., 250 volts) via a diode 202. The output 204 is coupled to the wiper 98 of screen bias potentiometer 97 rather than to node 99 and the output of the regulator 80 is applied to resistor 94 which was previously coupled to ground reference potential.

With the above changes transistor 85' regulates the screen grid G2 voltage indirectly by controlling the reference potential applied to resistor 94. An increase in this potential will increase the value of the screen voltage in proportion to the output of regulator 80 but reduced by the voltage drop across resistor 94. Diode 202 prevents voltage increases beyond 250 volts at the lower end of resistor 94. The additional voltage for providing screen level potentials is provided by the offset of resistor 94 and by adjustment of potentiometer 97 to bring the screen voltage up to a value in the 400–800 volt range. Accordingly, the maximum control range for screen voltage equals the initial voltage set by potentiometer 97 plus or minus one half of the supply applied to diode 202. If, for example, potentiometer 97 is set to 600 volts, with regulator 80 providing a centered (125 volt) output, then the screen voltage control range will be from a minimum of 475 volts to a maximum of 725 volts. A range of this width has been found sufficient to extend the basic AKB operating range sufficiently eliminate any need for later adjustments of the screen grid potentiometer as the kinescope leakage build up and are cleared, for example, by inter electrode arcing. This embodiment of the invention, may be viewed as being semi-automatic in that although an initial adjustment is required, no further adjustments of the screen grid high voltage potentiometer are required, a lower voltage regulator transistor may be used and no modification of the focus/screen supply assembly is required.

Figure 3:
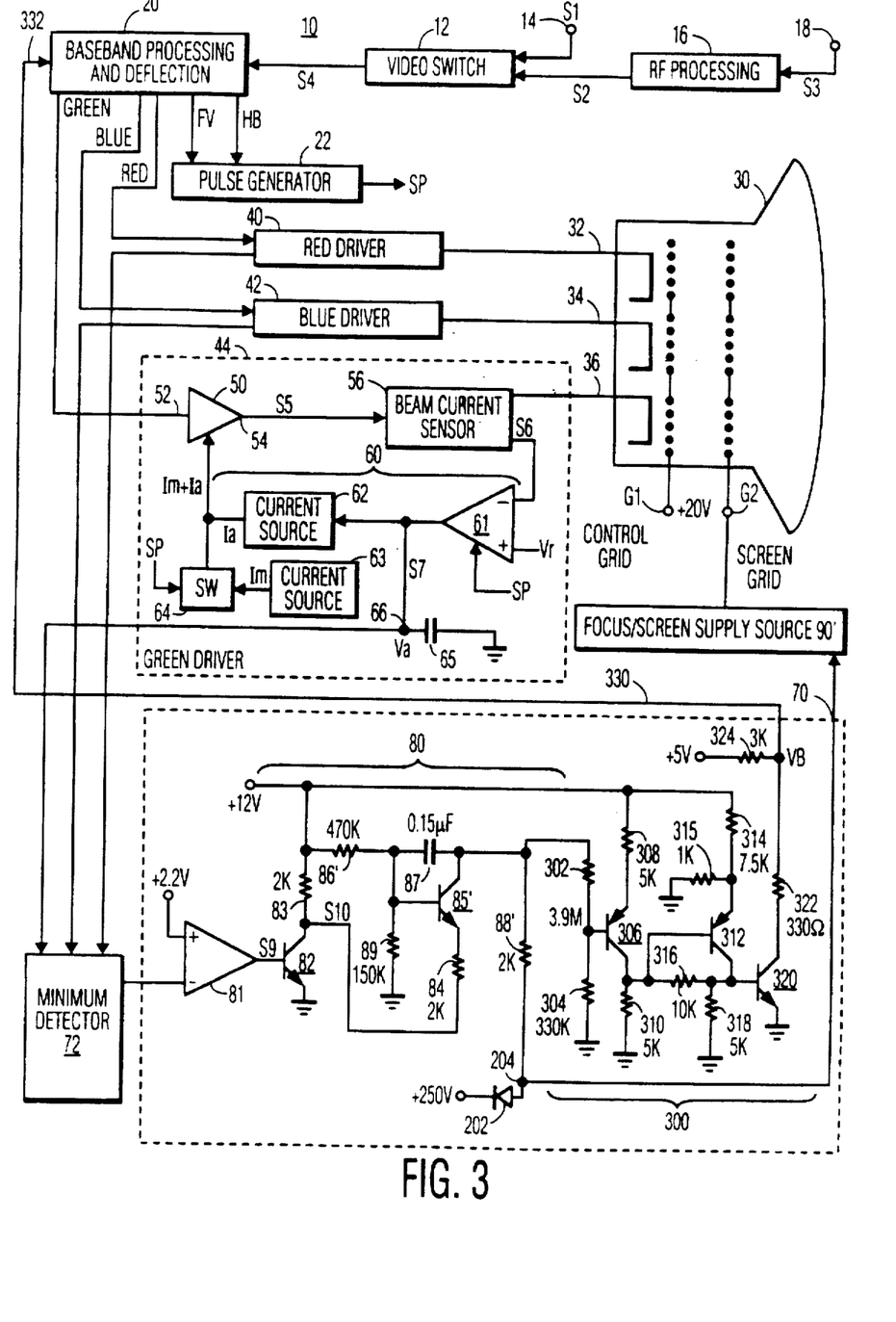
FIG. 3 is a block diagram, partially in schematic form, illustrating a modification of the embodiment of FIG. 2 providing a set-up adjustment adjunct.

FIG. 3 illustrates a modification of the embodiment of FIG. 2 which facilitates adjustment of the screen grid potentiometer 97. To simplify the drawing, the minimum detector 72 and the focus/screen unit 90 have been drawn in block diagram form since these units are not changed. The regulator 80, outlined in phantom, has been modified to include a window detector and blanking control unit 300 which may be used during initial set-up (i.e., factor calibration) of the screen grid bias potentiometer 97.

Unit 300 comprises resistors 302 and 304 connected as a potential divider between the collector of the output transistor 85 of regulator 80 and ground. These elements reduce the relatively high voltage changes at the collector of transistor 85 to a low voltage (logic) level in the range 0–5 volts. The relatively high impedance of the voltage divider is reduced and the signal is inverted by means of transistor 306 having a base electrode coupled to the divider output and equal valued emitter and collector load resistors 308 and 310 which thus provides unity gain. Window detection is provided by transistor 312 having an emitter coupled to the low voltage supply via resistor 314, a base coupled to the output (collector) of transistor 306 and having a collector coupled to the collector of transistor 306 via resistor 316; to ground via resistor 318 and to ground via the base emitter path of output transistor 320. Logic level (e.g., 5 volt) output signals are produced by transistor 320 by the load resistor 324 coupled to a 5 volt supply. A series 330 ohm resistor provides protection from surge currents from output line capacitance during turn-on of transistor 320. The output of transistor 320 is coupled by conductor 330 to a blanking input 332 of the baseband processing unit In operation, transistor 320 will be biased off only for values of the collector voltage of transistor 85 within the middle of the screen grid operating range (e.g., around 125 volts for the 250 volt supply shown). For this condition the video signals provided by unit 20 will be unblanked signifying proper adjustment of screen grid bias potentiometer 97 in focus/screen unit 90. For collector voltages outside midrange, transistor 320 will be biased on thus blanking the display and signifying that potentiometer 97 requires adjustment. This blanking is enabled only during the receiver set-up mode by activation of the receiver service mode switch. Accordingly, during normal operation of the receiver the blanking signal is ignored and the screen control voltage varies with its full operating range (0–250 volts).

FIG. 4 illustrates circuit details of a kinescope driver amplifier and beam current sensor suitable for use as amplifier 50 and sensor 56 and in which, advantageously, the sensor provides dual functions of acting as a buffer amplifier for the amplified video signal and as a beam current sensor. Amplifier 50 includes an input transistor 402 coupled in cascode with an output transistor 404. The gain of the amplifier is determined by the ratio of a collector load resistor 406 of the common base connected output transistor 404 and an emitter load resistor 403 in the emitter circuit of input transistor 402. The relatively high output impedance of the amplifier is reduced by means of a complementary emitter follower buffer amplifier comprising transistors 408 and 410 having emitter electrodes coupled via protection resistor 416 to cathode 36 of kinescope 30 and having respective surge current limiting resistors 412 and 414 in their collector circuits. These resistors are sometimes referred to as being for "suicide prevention" as they limit the maximum transistor rail to rail current flow during simultaneous conduction of the transistors 408 and 410 which can occur briefly under large signal transient conditions. Diode 418 provides an offset between the base electrodes of transistors 408 and 410 for reducing the amplifier cross-over distortion. The collector of transistor 408 provides an output for beam current flow to the AKB current sensor input (comparator 61). The measurement current input from the AKB circuit is applied to the emitter of the common base connected output transistor 404.

To briefly summarize the operation of amplifier 50 and sensor 56, the transistor 402 amplifies the green video input signal with a gain determined by the ratio of resistors 406 and 403. Transistor 404 suppresses the Miller effect by regulating the collector voltage of transistor 402 at a constant value (12 volts less Vbe 404). Diode 418 partially offsets the output drive signals to the buffer amplifier 60 to reduce cross over distortion. Amplifier 56 provides unity gain and an impedance reduction as well as sensing the beam current. Resistors 414 and 412 limit maximum rail to rail current flow through transistors 408 and 410 during large video transients. The collector current of transistor 408 represents the kinescope beam current and a portion of it is sent to comparator 61 as the AKB beam indicating current with the measurement current being applied to the emitter of transistor 404.

Figure 5:
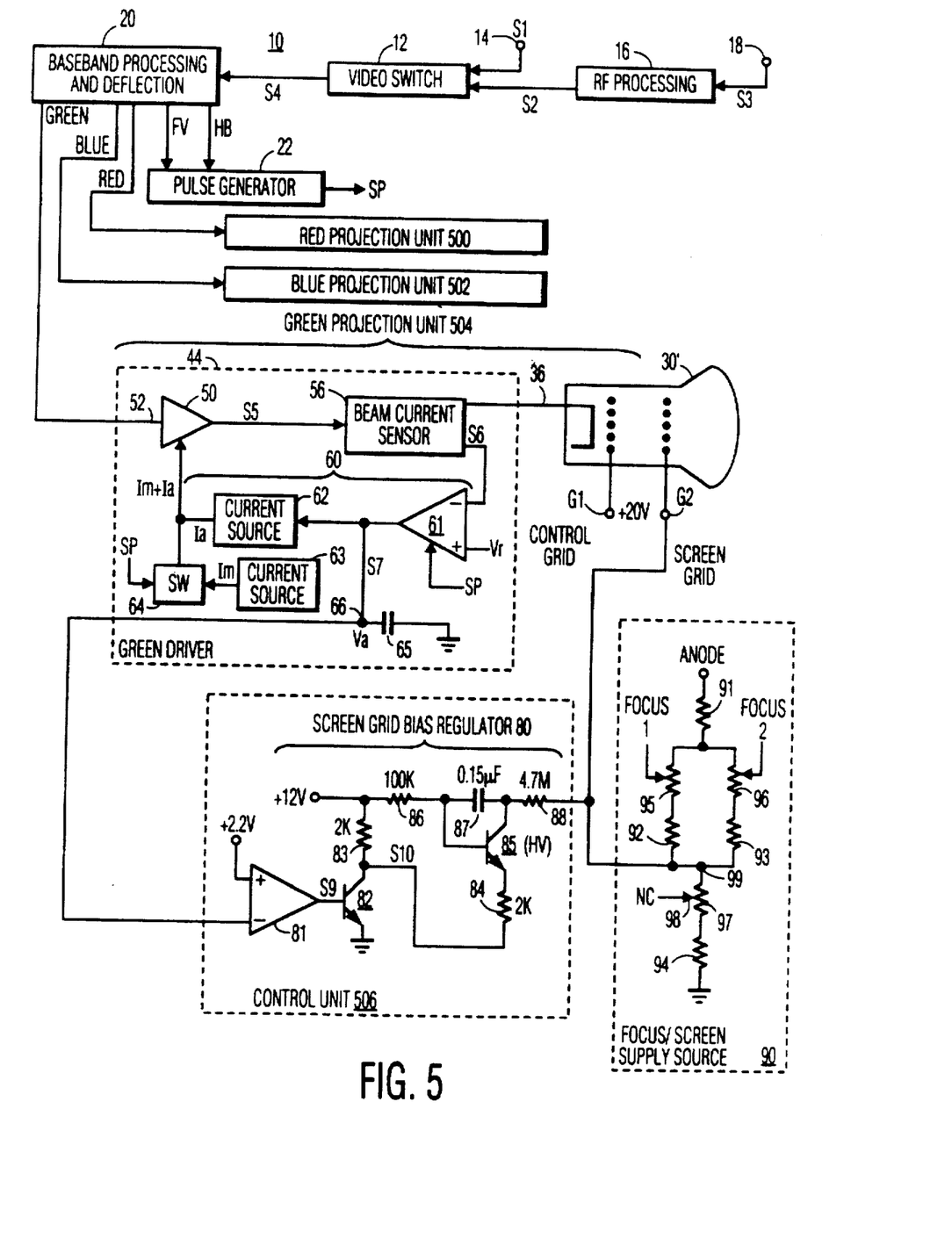
FIG. 5 is a block diagram, partially in schematic form, illustrating a modification of the embodiment of FIG. 1 for operation in a color projection television system.

Various changes and modifications may be made to the examples of the invention discussed thus far. FIG. 5 illustrates modifications of the example of FIG. 1 for applying the principles of the invention to a projection television system. The principal modification is to provide three kinescopes, one for each color, and three separate black level control systems. Since each kinescope has a separate screen grid G2 electrode available the minimum selector 72 may be omitted from the screen grid bias control unit of each projection unit. Since the projection units 500, 502 and 504 are identical, only the details of the green unit 504 are shown.

Green projection unit 504 includes the green driver 44 with no changes for driving the cathode 36' of a green projection kinescope 30'. The focus/screen supply source 90 is unchanged and is coupled to the screen grid of kinescope 30' and to the output of the screen grid bias regulator 80 as before which is also unchanged. The only other change is that selector 72 is omitted and the input of amplifier 81 is coupled directly to node 66 of driver 44 to receive the black level representative voltage developed across capacitor 65 in response to the beam current indicating signal S6. Operation of this embodiment of the invention is the same as previously described except for the absence of selector 72. Omitting this element and providing each projection kinescope with its own black level regulating system provides a further increase in the black level operating range because no allowance has to be made for differences between the kinescope guns as before. Thus each gun is separately optimized.

Figure 6:
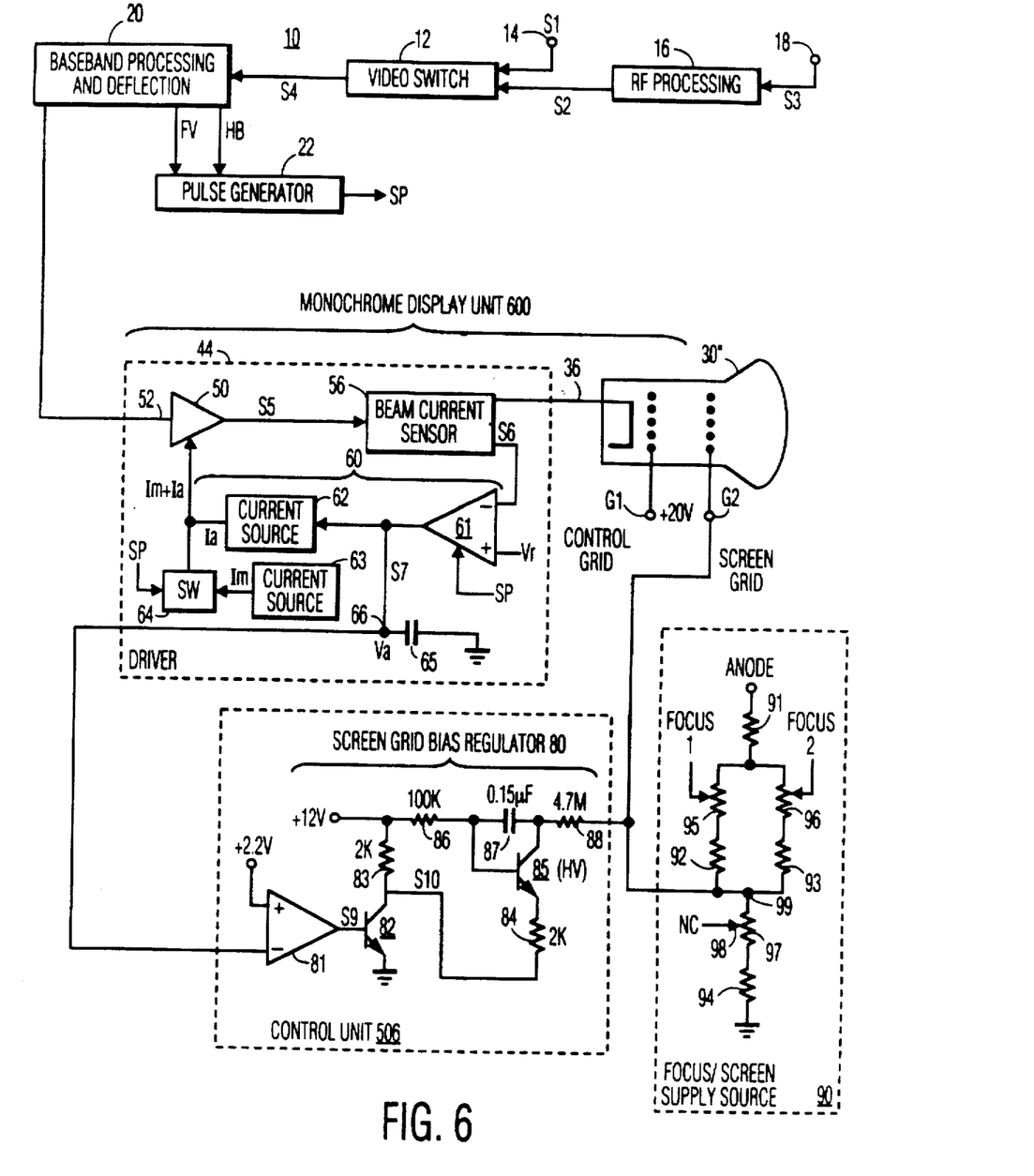
FIG. 6 is a block diagram, partially in schematic form, illustrating a modification of the embodiment of FIG. 5 for operation in a monochrome television system.

The modification of FIG. 6 for operation with a direct view monochrome kinescope comprises replacing the projection kinescope 30' of FIG. 5 with a direct view monochrome kinescope 30" and removing the projection units 502 and 504. Operation is the same as in the example of FIG. 5 except for the use of a direct view monochrome kinescope.

The modifications of FIGS. 5 and 6 may be readily applied to the previous examples of FIGS. 2 and 3 if desired to obtain the benefits thereof as previously discussed in projection and monochrome display systems.

Figure 7:
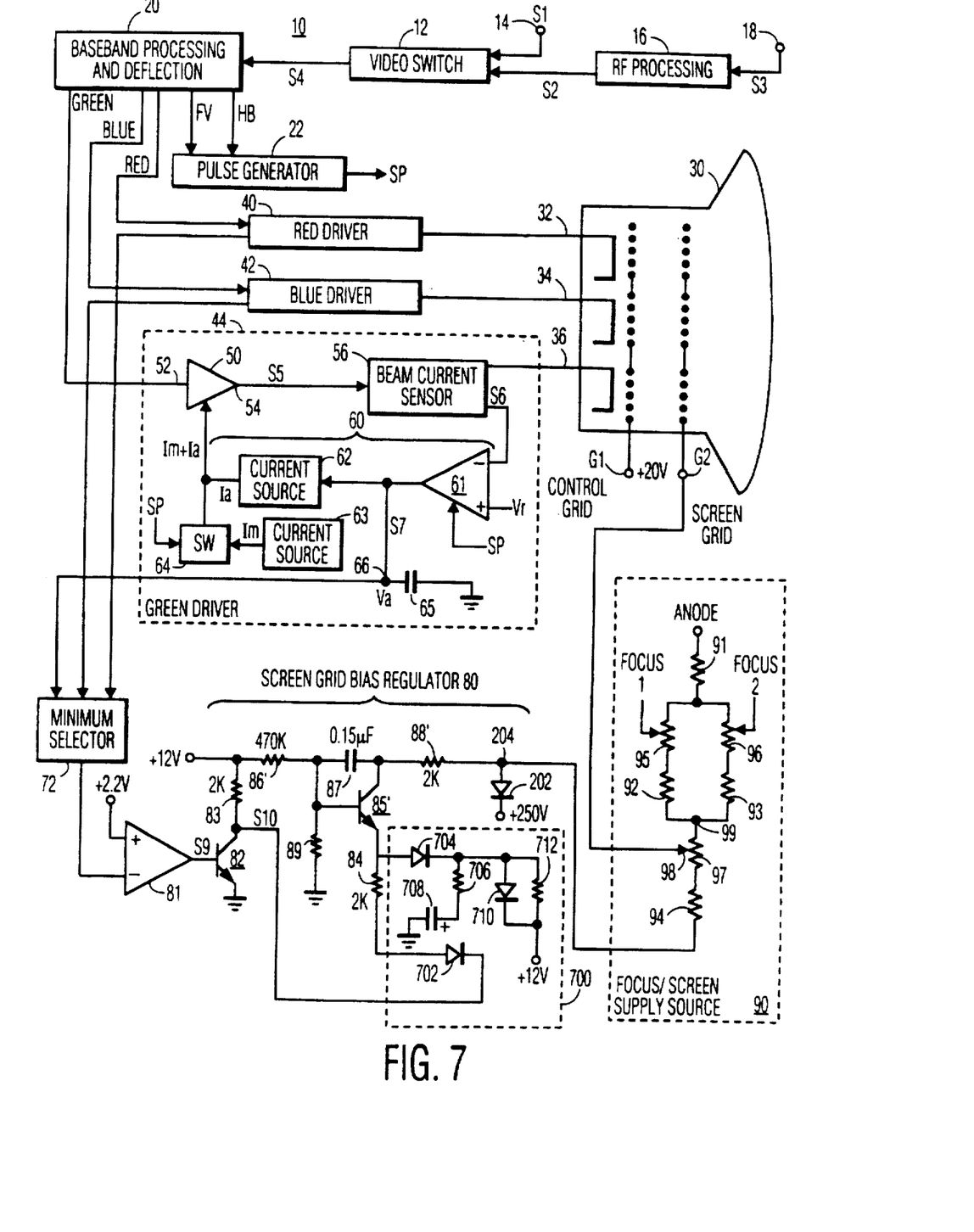
FIG. 7 is a block diagram, partially in schematic form, illustrating a modification of the embodiment of FIG. 2 for providing momentarily reduced screen grid voltage during turn-on of the receiver.

In FIG. 7 the system of FIG. 2 has been modified by the addition of a timing circuit 700 connected to the emitter of transistor 85 in screen grid bias regulator 80 which momentarily reduces the screen supply voltage of kinescope 30 upon initial application of power.

The purpose of momentarily reducing the screen grid voltage upon initial application of operating power is to suppress visual artifacts during turn on of the receiver. It has been found that the combination of the AKB and the screen grid bias control loops will tend to cause higher than normal screen grid (G2) voltage as the kinescope cathode heats during turn-on. As a result, retrace lines may be visible until warm-up is complete.

Conventional power up circuits which rely on boosting the cathode voltage or depressing the control grid (G1) voltage are not entirely effective for purposes of the present invention because the screen grid voltage is controlled and closely linked to the AKB system. Accordingly, in applications such as the present invention wherein the screen grid voltage is "linked" or dependent on the AKB operation, it is very desirable that the screen voltage be depressed momentarily during turn-on in addition to what other measures may be taken (if any) to obtain turn-on blanking (e.g., cathode blanking for driving the cathode voltage positive or grid G1 blanking by driving the control grid negative).

In more detail, the screen grid supply delay timing is provided in circuit 700 by adding a diode 702 in series with the emitter load resistor 85 of transistor 85 and coupling the emitter to a timing capacitor 708 via a series connection of a diode 704 and a surge current limiting resistor 706. The anode of diode 704 also is coupled to the low voltage supply terminal (+12 V) by means of a paralleled connected diode 710 and resistor 712. Due to space limitations in the drawing, element values are not shown. Exemplary values, however, are as follows: resistor 706, 330 Ohms; resistor 712, 3.3 Meg-Ohms and capacitor 708, 180 micro-Farads (polarized as indicated).

In operation, diode 710 provides a discharge path for capacitor 708 to ground via the low voltage (+12 V) supply each time the receiver is turned off. Upon turn-on of the receiver capacitor 708 is charged from the 12 volt supply via diode 704 thus turning the screen regulator transistor 85 on and reducing the screen voltage as the capacitor charges. Diode 702 prevents capacitor 708 from receiving any charging current from resistor 83 and so effectively all of the charging current is obtained via transistor 85. This ensures a maximum charging time for a given value of capacitance for capacitor 708. The small current (e.g., a few micro-Amps) provided by resistor 712 is negligible and does not significantly shorten the charging time constant. The reason resistor 712 is present is to compensate for leakage current in capacitor 708 after the timing cycle is complete. Advantageously, with this compensation, after capacitor 708 is charged essentially all of the screen regulation current is available for control by transistor 82 and none at all of the screen regulation current is required for maintaining the charge on capacitor 708. The timing cycle is complete when the capacitor voltage exceeds the base bias level of transistor 85 (less the drops across Vbe 85 and Vpn 704) the diode 704 turns off, charging stops and normal screen voltage regulation begins via transistor 85 as previously described. Turn-off of the receiver will again discharge capacitor 708 via diode 710 and the timing cycle will repeat as described above the next time the receiver is turned on.

What is claimed is:

1. A method for adjusting the black level of a kinescope, comprising:

applying a reference potential to a control grid (G1) of said kinescope;

applying a screen grid potential to a screen grid (G2) of said kinescope;

applying a video signal to a cathode of said kinescope;

providing a beam current indicating signal;

deriving a black level indicating signal from said beam current indicating signal;

applying a black level adjustment current to said cathode as a function of said black level indicating signal to thereby form an AKB control loop having a range of black level control; and adjusting said screen grid potential as a function of said black level indicating signal to thereby form a second black level control loop for extending said range of black level control.

2. A method as recited in claim 1 wherein, for a color kinescope having three cathodes and a common screen grid, further comprising:

generating a separate black level representative signal for each cathode and adjusting the screen grid potential as a function of the least of said black level representative signals.

3. A method for adjusting the black level of a kinescope, comprising:

applying a screen grid potential to a screen grid (G2) of said kinescope;

applying a video signal to a cathode of said kinescope;

providing a beam current indicating signal;

deriving a black level indicating signal from said beam current indicating signal;

applying a black level adjustment current to said cathode as a function of said black level indicating signal; and adjusting said screen grid potential as a function of said black level indicating signal;

providing a screen grid supply source for producing said screen grid potential; and wherein the adjusting step includes:

comparing the black level representative signal with a reference level signal to produce a control signal; and applying the control signal to a circuit node in said screen grid supply source for adjusting the magnitude of said screen grid potential.

4. A method for adjusting the black level of a kinescope, comprising:

applying a screen grid potential to a screen grid (G2) of said kinescope;

applying a video signal to a cathode of said kinescope;

providing a beam current indicating signal;

deriving a black level indicating signal from said beam current indicating signal;

applying a black level adjustment current to said cathode as a function of said black level indicating signal; and adjusting said screen grid potential as a function of said black level indicating signal; and momentarily reducing said screen grid potential upon initial application of operating power to said kinescope.

5. Apparatus for adjusting the black level of a kinescope, comprising:

a screen grid supply for applying a screen grid potential to a screen grid of said kinescope;

a driver amplifier for applying a video signal to a cathode of said kinescope;

a beam current sensor for providing a beam current indicating signal;

means for deriving a black level indicating signal from said beam current indicating signal;

a first feedback path coupled between said deriving means and said driver amplifier for applying a black level adjustment current to said cathode as a function of said black level indicating signal; and a second feedback path coupled between said deriving means and said screen grid supply for adjusting said screen grid potential as a function of said black level indicating signal.

6. Apparatus as recited in claim 5 wherein the second feedback path includes:

a comparison circuit for comparing the black level representative signal with a reference level signal to produce a control signal; and a circuit path for applying the control signal to a circuit node in said screen grid supply source for adjusting the magnitude of said screen grid potential.

7. Apparatus as recited in claim 5 wherein, for a color kinescope having three cathodes and a common screen grid, said apparatus further comprises:

means for generating a separate black level representative signal for each cathode and adjusting the screen grid potential as a function of the least of said black level representative signals.

8. Apparatus as recited in claim 5 further comprising:

a timing circuit coupled to a point in said second feedback path for momentarily reducing said screen grid potential upon initial application of operating power to said kinescope.

9. A video display system, comprising:

a kinescope (30) having a cathode (36), having a screen grid (G2), and having a control grid (G1) interposed between said cathode and said screen grid, said control grid (G1) being biased at a predetermined potential (+20V);

a source (90) of screen grid voltage coupled to said screen grid;

a video driver amplifier (50) having an input (52) coupled to receive a video input signal and an output (54) coupled to supply an amplified video signal (S5) to said cathode;

a beam current sensor (56) coupled to said cathode (36) for providing a beam current indicating signal (S6);

an AKB regulator (60) responsive to said beam current indicating signal (S6) for producing and supplying a black level correction signal ($I_a$) to said driver amplifier (50) for regulating the black level of images displayed by said kinescope (30) over a black level control range; and a screen grid bias regulator (80) coupled to said source (90) of screen grid voltage and coupled to a point (66) in said AKB regulator (60) for varying said screen grid voltage as a function of said black level correction signal ($I_a$) of said AKB regulator for extending said black level control range.

10. A video display system as recited in claim 9 wherein, for a color kinescope having three cathodes and a common screen grid, said apparatus further comprises:

means (40–44) for generating a separate black level representative signal (Va) for each cathode (32–36) and means (72, 80) for adjusting the screen grid potential as a function of the least of said black level representative signals.

11. A video display system comprising:

a kinescope (30) having a cathode (36) and a screen grid (G2);

a source (90) of screen grid voltage coupled to said screen grid;

a video driver amplifier (50) having an input (52) coupled to receive a video input signal and an output (54) coupled to supply an amplified video signal (S5) to said cathode;

a beam current sensor (56) coupled to said cathode (36) for providing a beam current indicating signal (S6);

an AKB regulator (60) responsive to said beam current indicating signal (S6) for producing and supplying a black level correction signal ($I_a$) to said driver amplifier (50) for regulating the black level of images displayed by said kinescope (30); and a screen grid bias regulator (80) coupled to said source (90) of screen grid voltage and coupled to a point (66) in said AKB regulator (60) for varying said screen grid voltage as a function of said black level correction signal ($I_a$) of said AKB regulator and wherein the screen grid bias regulator comprises:

a comparison circuit (81) for comparing the black level representative signal (Va) with a reference level signal (2.2v) to produce a control signal (S9); and a shunt regulator (82, 85) coupled to a circuit node (98 or 99) in said screen grid supply source (90) and responsive to said control signal for adjusting the magnitude of said screen grid potential.

12. A video display system comprising:

a kinescope (30) having a cathode (36) and a screen grid (G2);

a source (90) of screen grid voltage coupled to said screen grid;

a video driver amplifier (50) having an input (52) coupled to receive a video input signal and an output (54) coupled to supply an amplified video signal (S5) to said cathode;

a beam current sensor (56) coupled to said cathode (36) for providing a beam current indicating signal (S6);

an AKB regulator (60) responsive to said beam current indicating signal (S6) for producing and supplying a black level correction signal ($I_a$) to said driver amplifier (50) for regulating the black level of images displayed by said kinescope (30);

a screen grid bias regulator (80) coupled to said source (90) of screen grid voltage and coupled to a point (66) in said AKB regulator (60) for varying said screen grid voltage as a function of said black level correction signal ($I_a$) of said AKB regulator and a timing circuit coupled to a point in said second feedback path for momentarily reducing said screen grid potential upon initial application of operating power to said video display system.

13. A video display system, comprising:

a kinescope (30) having a cathode (36) and a screen grid (G2);

a screen grid supply source (90) coupled to said screen grid (G2);

a video driver amplifier (50) having an input (52) coupled to receive a video input signal and an output (54) coupled to supply an amplified video signal (S5) to said cathode;

a beam current sensor (56) coupled to said cathode (36) for providing a beam current indicating signal (S6);

a capacitor (65);

charging circuit (61) responsive to said beam current indicating signal for charging said capacitor to a potential representative of the black level of said kinescope;

a first feedback path (62) coupled between said capacitor and said amplifier for regulating said black level of said kinescope; and a second feedback path (80) coupled between said capacitor and said screen grid supply source for regulating said black level of said kinescope.

14. A video display system as recited in claim 13 wherein said second feedback path comprises:

an amplifier (81) for comparing said black level representative signal (Va) with a reference level signal (+2.2V) to produce a control signal (S9) at an output thereof; and means coupling said control signal (S9) to a circuit node (98 or 99) in said screen grid supply source (90).

15. A video display system as recited in claim 13 wherein said kinescope comprises a direct view color kinescope having three cathodes, each cathode being coupled to a respective driver amplifier and beam current sensor, each beam current sensor being coupled to a respective capacitor via a respective comparison amplifier for charging said capacitors to respective black level indicating voltages; and further comprising:

selection means (72) for selecting one of said capacitor black level indicating voltages for application to said amplifier (81) in said second feedback path.

16. A video display system as recited in claim 13 further comprising a timing circuit (700) coupled to a point in said second feedback path (80) for momentarily reducing said screen grid potential upon initial application of operating power to said kinescope.

* * * * *